United States Patent [19]
Davenport et al.

[11] Patent Number: 5,216,707
[45] Date of Patent: Jun. 1, 1993

[54] CIRCUIT FOR FIRING PAYSTATION COIN RELAY USING POWER DERIVED FROM TELEPHONE LINE TIP/RING VOLTAGE

[75] Inventors: Marcus K. Davenport, Cumming; Richard K. Shipman, Woodstock; Thomas D. Young, Snellville; Stephen H. Strode, Norcross, all of Ga.

[73] Assignee: International Teleservice Corp., Melbourne, Fla.

[21] Appl. No.: 740,576

[22] Filed: Aug. 6, 1991
(Under 37 CFR 1.47)

[51] Int. Cl.$^5$ .................. H04M 17/02; H04M 19/06
[52] U.S. Cl. ................................. 379/153; 379/152; 379/413
[58] Field of Search ............... 379/152, 153, 155, 413

[56] References Cited
U.S. PATENT DOCUMENTS

| | | | |
|---|---|---|---|
| 4,759,050 | 7/1988 | Mellon | 379/36 |
| 4,759,054 | 7/1988 | Mellon | 379/145 |
| 4,803,719 | 2/1989 | Ulrich | 379/413 |
| 4,860,345 | 8/1989 | Mellon | 379/123 |
| 4,860,346 | 8/1989 | Mellon | 379/413 |

Primary Examiner—Stafford D. Schreyer
Attorney, Agent, or Firm—Evenson, McKeown, Edwards & Lenahan

[57] ABSTRACT

Increased power to operate a paystation coin relay is derived from the tip/ring pair by means of a power boost circuit, which is controllably coupled to the tip/ring pair when the coin relay is to be fired. To fire the coin relay, a line coupling relay circuit is energized, so as to apply the tip/ring line voltage to a D.C.-to-D.C. converter, the output of which is coupled to current storage (capacitor) circuit. The output of the current storage circuit is coupled to a first switch circuit and monitored by a comparator. The first switch circuit has an output coupled in circuit with the coin relay. In response to the comparator detecting that the current storage circuit has accumulated sufficient electrical energy to fire the coin relay, the comparator enables the first switch circuit, so that the output of the current storage circuit is applied to the coin relay, thereby firing the coin relay, to either collect accumulated coins or return the coins to the paystation user, depending upon a controllably established coin relay current flow path to the coin relay winding. The output of the comparator is further coupled through a delay circuit to a second transistor switch circuit which is coupled to the line coupling relay. The second switch circuit is operative to apply a de-energizing potential to the line relay a prescribed period of time subsequent to the firing of the coin relay, thereby returning the line relay to its normal state.

10 Claims, 1 Drawing Sheet

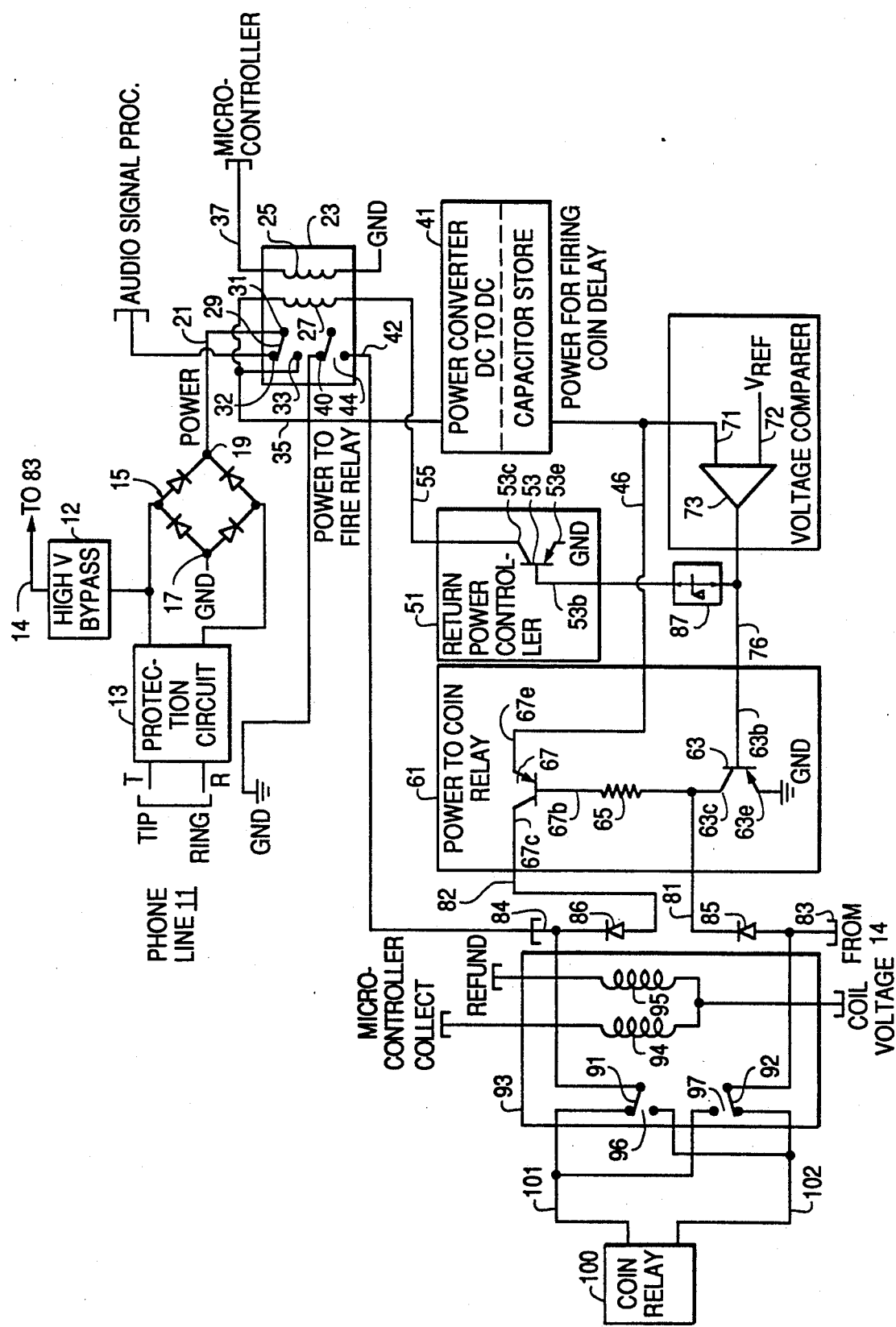

CIRCUIT FOR FIRING PAYSTATION COIN RELAY USING POWER DERIVED FROM TELEPHONE LINE TIP/RING VOLTAGE

FIELD OF THE INVENTION

The present invention relates in general to telephone systems and is particularly directed to a paystation telephone circuit for controlling the operation of a coin relay using power derived from the telephone line (tip/ring) voltage.

BACKGROUND OF THE INVENTION

Because of the magnitude of the electro-mechanical force employed for the collection and refund of coins that have accumulated in the coin collection bin or hopper of a paystation telephone, the power requirements of the coin relay used to operate the bin are substantially greater than those of the signalling and audio circuitry of the paystation set. As a consequence, it has been a customary practice to derive coin relay power from a separate power source. In the case of a regulated line, the power for the coin relay is supplied directly from the central office. In the case of a customer owned, coin operated telephone (COCOT), however, this auxiliary power source must be provided on site, either by way of connection to a 110 volt A.C. line or by the installation of a separate battery. Both of these latter options are undesirable, as they require a separate power interface for the paystation circuitry, raise maintenance overhead and increase operating costs.

SUMMARY OF THE INVENTION

In accordance with the present invention, the need for a separate power source to operate paystation components such as the coin relay, the power requirements of which are in excess of what is providable by way of the line differential voltage, are obviated by a power boost circuit, which is controllably coupled to the tip/ring pair through which audio signal processing is conducted. The power boost circuit is normally decoupled from the tip/ring pair, until the need for a specified paystation function, such as the operation of the coin relay to either collect or return coins to the paystation user, is required. However, the power boost circuit could be continually coupled and then simply activated to fire the coin relay.

Pursuant to the invention, when the coin relay is to be fired, a line coupling relay circuit, through which the telephone line tip/ring pair is normally coupled to the audio signal processing circuit of the paystation, is energized, so as to apply the (48 V) differential of the tip/ring pair to a fast response time D.C.-to-D.C. converter, the output of which is coupled to current storage (capacitor) circuit. The output of the current storage circuit is coupled to a first (transistor) switch circuit and monitored by a comparator. The first switch circuit has an output coupled in circuit with the coin relay. In response to the comparator detecting that the current storage circuit has accumulated sufficient electrical energy to fire the coin relay, the comparator enables the first switch circuit, so that the output of the current storage circuit is applied to the coin relay, thereby firing the coin relay, to either collect accumulated coins or return the coins to the paystation user, depending upon a controllably established coin relay current flow path to the coin relay winding. The output of the comparator is further coupled through a delay circuit to a second transistor switch circuit which is coupled to the line coupling relay. The second switch circuit is operative to apply a de-energizing potential to the line relay a prescribed period of time subsequent to the firing of the coin relay, thereby returning the line relay to its normal state.

As a further feature of the present invention, in addition to providing coin relay power from the power boost circuit, so that no external power source (110 A.C. line or separate battery) is required, a parallel circuit path is coupled to receive coin relay power by way of the central office, so that the invention may be incorporated in both COCOT and regulated paystations. When the coin relay is to be fired by way of the central office, the power boost circuit simply remains disabled, with the line coupling relay circuit providing a circuit path for the telephone line tip/ring pair to the audio signal processing circuit of the paystation.

This circuit can be used in an integrated COCOT and regulated paystation telephone system as described in co-pending U.S. patent application Ser. No. 07/740,841, filed on even date herewith and being commonly assigned to the assignee of the present invention.

BRIEF DESCRIPTION OF THE DRAWINGS

The single Figure diagrammatically illustrates a controllably enabled coin relay power boost circuit in accordance with an embodiment of the present invention.

DETAILED DESCRIPTION

Referring now to the single Figure of the drawings, a telephone line tip/ring pair 11, with an optional ground line from a central office for a regulated system, to which a paystation telephone is connected is shown as being coupled through an overvoltage protection circuit 13 (e.g. a back-to-back Zener diode pair bridging tip and ring) to a full wave bridge circuit 15, a first node 17 of which is coupled to a reference potential (ground) and a second node 19 of which is coupled to a line 21. The potential of line 21 is normally at some prescribed differential (e.g. 48 V) relative to ground node 17 and is customarily coupled to the paystation's micro-controller and associated audio signal processing circuitry. As the details of such circuitry are unnecessary for an understanding of the present invention, no description will be given here.

Pursuant to the present invention, interposed in line 21 is a latching type line coupling relay circuit 23, having a pair of coil windings 25, 27 and switchable contacts 29 and 44. When the line coupling relay circuit 23 is in its normally de-energized state, switchable contact 29 is in the position shown in the Figure, bridging a first contact node 31, which is in circuit with node 19, with a second contact node 32, which is in circuit with line 21. A third contact node 33 of line coupling relay circuit 23 is coupled via a line 35 to relay coil 27 and to a power accumulator circuit 41. Contact 44 includes a first contact node 40 connected to the ground line when the paystation is coupled with a regulated line. A second node 42 connects with a collect/return control relay 93 described below. Power accumulator circuit 41 is comprised of a conventional D.C.-to-D.C. converter, such as a MAXIM model 641, coupled in cascade with a storage capacitor circuit. A D.C.-to-D.C. converter having a fast response time is preferable. Relay winding 25 is coupled between ground and a control line 37 from the paystation's microcontroller.

Relay winding 27 is further coupled to the collector of a switching transistor 53, to be described below.

The voltage across the storage capacitor circuit within power accumulator circuit 41 is coupled via line 46 to a coin relay power switch circuit 61 and to a first input 71 of a voltage comparator 73. A second input 72 of comparator 73 is coupled to a prescribed reference potential (e.g. on the order of several volts). Coin relay power switch circuit 61 includes a first bipolar switching transistor 63 having its base electrode 63b coupled via line 76 to the output of comparator 73, its emitter electrode 63e coupled to ground and its collector electrode 63c is coupled through a resistor 65 to the base electrode 67b of a bipolar switching transistor 67. Although each of the switching transistors of the power boost circuit is depicted as a bipolar device, it should be observed that the invention is not limited to the use of such devices and other electronic switching elements, such as field effect devices, may be used in their place.

The collector electrode 63c of transistor 63 is further coupled via a line 81 to a switching contact 92 of a collect/return control relay 93. Relay 93 has a pair of control windings 94, 95. One end of each of windings 94, 95 is coupled in common to receive a coil energizing voltage. The other ends of windings 94, 95 are respectively coupled to receive 'collect' and 'return' signals from the micro-controller, to delineate which of terminal pairs 96 and 97 are bridged by first switching contact 91 and a second switching contact 92 of relay 93. The outputs of terminal pairs 96 and 97 are coupled via lines 101 and 102 to opposite ends of the coin relay winding within coin relay 100.

The emitter electrode 67e of transistor 67 is coupled to line 46, while its collector electrode 67c is coupled via line 82 to a second side of the winding of coin relay 100. Output line 76 from comparator 73 is further coupled via a delay circuit 87 to the base electrode 53b of a switching transistor 53. The emitter electrode 53e of transistor 53 is coupled to ground, while its collector electrode 53c is coupled via line 55 to winding 27 of line coupling relay 23. To provide for auxiliary power control of the coin relay, lines 82 and 84 connect to ground on the regulated line and lines 81 and 83 connect to a high voltage bypass line 14 output from a conventional high voltage bypass circuit 12 coupled to the tip output from the protection circuit 13. In this case, respective blocking diodes 85, 86 are inserted in the current flow path to the coil winding to isolate the C.O. sourced coin relay control from switching transistors 63 and 67.

OPERATION

As explained above, with line coupling relay 23 normally deenergized, the power boost circuit in accordance with the present invention is decoupled from tip/ring pair 11, so that the voltage (48 V) at node 19 of bridge 15 is coupled via line 21 to downstream audio signal processing circuitry. Assuming that the paystation is a COCOT unit, then, when the coin relay 100 is to be energized or 'fired' at the completion of the call, for the collection or refund of coins that have been inserted into the paystation, the paystation's micro-controller will first set relay 93 via coils 94 and 95 for collect or refund and then issue a 'fire' signal via line 37 to winding 25 of line coupling relay circuit 23.

In response to this coin relay firing signal, switchable contact 29 of line coupling relay 23 breaks the connection between relay nodes 31 and 32, thereby interrupting line 21, and makes the connection between nodes 31 and 33, so as to apply the (48 V) differential of the tip/ring pair to the D.C.-to-D.C. converter within power accumulator circuit 41. The increased voltage output of the converter is coupled to the power accumulator's capacitor storage circuit, the output of which is coupled over line 46 to the emitter electrode 67e of switching transistor 67 circuit and to input 71 of comparator 73.

As the charge accumulated on the storage capacitor circuit within power accumulator 41 increases, comparator 73 detects when the increasing voltage exceeds the threshold reference voltage applied to comparator input 72, indicating that the storage capacitor circuit has accumulated sufficient electrical energy to fire the coin relay. At this time the output of comparator 73 changes state (goes high), thereby turning on switching transistor 63. Alternatively, power from node 19 can be continually coupled to the audio signal processing circuitry and the D.C.-to-D.C. converter, hence eliminating the relay. In this arrangement, the micro-controller can vary the $V_{ref}$ signal input to comparator 73 to fire the coin relay 100.

When transistor 63 turns on, the reference voltage (ground) at its emitter 63e is coupled to the base 67b of transistor 67 and, via line 81 and one of lines 101, 102 (depending upon whether coins are to be collected or returned), to one side of the winding of coin relay 100. Switching transistor 67 is turned on by the low signal now applied to its base, thereby causing the accumulated firing potential on line 46 to be coupled through its emitter-collector path to line 82 for application to the other side of the coin relay winding, firing the coin relay. Whether or not coins deposited by the customer are to be collected or refunded will depend upon the application of a 'collect' signal or a 'return' signal to the respective windings 94, 95 of relay 93, as described above.

A prescribed period of time (e.g. 400 ms.) after the output of comparator 73 changes state, delay circuit 87 applies the high on line 76 to the base electrode 53b of transistor 53, thereby causing a low voltage to be coupled through transistor 53 to winding 27 of line coupling relay 23, thus de-energizing the line relay and returning its switchable contact 29 to its normal state, bridging line 21 to restore the line voltage to the audio signal processing circuitry and decoupling the power boost circuit from the tip/ring pair.

The foregoing description of the operation of the coin relay power boost circuit in accordance with the present invention applies to the installation of the circuit in a COCOT or regulated line paystation telephone. Where the paystation is controlled by the central office via a regulated line, the microcontroller can optionally supervise the line coupling relay or, when not supervising, then the current necessary to fire the coin relay is coupled directly to collect/return control relay 93 via auxiliary lines 83, 84, as described previously.

As will be appreciated from the foregoing description, the conventional necessity of deriving coin relay power from a power source separate from that available from the line circuit in an unregulated paystation environment is obviated in accordance with the controllable power boost circuit of the present invention which, advantageously, is readily coupled with the tip/ring pair through which audio signal processing is conducted, so as to minimize maintenance and operating overhead. By means of an auxiliary parallel path the coin relay is also controllable by means of the central office, so that the present invention has utility in both regulated and unregulated paystation telephones.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a paystation telephone which is configured to be coupled to a telephone line tip/ring pair by way of which a telephone line tip/ring voltage is provided for use by the paystation's signal processing circuitry in the course of the operation of the paystation telephone, and a coin relay which is controllably operated to effect the collection or return of coins supplied by a paystation user, a circuit arrangement for controllably energizing the coin relay comprising:

an electrical energy boost and accumulation circuit, coupled to said telephone line to receive the telephone line tip/ring voltage provided by said telephone line and generating therefrom electrical energy sufficient to operate said coin relay; and a controlled switch circuit, coupled with said electrical energy accumulation circuit, and operative to controllably couple said telephone line voltage to said electrical energy accumulation circuit and to couple said sufficient electrical energy to said coin relay;

wherein said controlled switch circuit is operative to decouple said electrical energy boost and accumulation circuit from said telephone line, after coupling said accumulated electrical energy to said coin relay.

2. A circuit arrangement according to claim 1, wherein said electrical energy accumulation and boost circuit includes a D.C.-to-D.C. voltage converter which is coupled by said controlled switch circuit to said telephone line, and an electrical energy storage circuit coupled to receive an increased D.C. voltage output by said D.C.-to-D.C. voltage converter.

3. A circuit arrangement according to claim 2, wherein said controlled switch circuit includes a comparator circuit coupled to said electrical energy accumulation and boost circuit, and an output switch circuit operative to couple said sufficient electrical energy to said coin relay in response to said comparator circuit detecting that the accumulated energy has reached a prescribed threshold sufficient to energize said coin relay.

4. A circuit arrangement according to claim 3, wherein said controlled switch circuit includes a delayed switching circuit, coupled to the output of said comparator circuit, and operative to decouple said electrical energy accumulation and boost circuit from said telephone line, subsequent to said output switch circuit coupling said sufficient electrical energy to said coin relay.

5. A circuit arrangement according to claim 1, further including a central office power supply link provided through the telephone line tip and a ground line, arranged to be coupled in circuit from the central office to said coin relay and operative to energize said coin relay under the control of said central office.

6. For use with a paystation telephone which is configured to be coupled to a telephone line tip/ring pair by way of which a telephone line tip/ring voltage is provided for use by the paystaion's signal processing circuitry in the course of the operation of the paystation telephone, and a device which is controllably operated by electrical energy greater than that normally available from said telephone line, a circuit arrangement for controllably energizing said device using electrical energy provided by way of said telephone line tip/ring pair circuit comprising:

an electrical energy accumulation and boost circuit, coupled to said telephone line circuit to receive the telephone line tip/ring voltage provided by said telephone line circuit and generating therefrom electrical energy sufficient to operate said device; and a controlled switch circuit, coupled with said electrical energy accumulation and boost circuit, and operative to controllably couple said telephone line tip/ring voltage to said electrical energy accumulation and boost circuit and to couple therefrom said sufficient electrical energy to said device;

wherein said device comprises a coin relay and wherein said electrical energy accumulation and boost circuit is coupled exclusively to said telephone line circuit to receive the telephone line voltage provided by said telephone line circuit and generates therefrom electrical energy sufficient to operate said coin relay; and wherein said controlled switch circuit is operative to decouple said electrical energy accumulation and boost circuit from said telephone line, after coupling said accumulated electrical energy to said coin relay.

7. A circuit arrangement according to claim 6, wherein said electrical energy accumulation and boost circuit includes a D.C.-to-D.C. voltage converter which is coupled by said controlled switch circuit to said telephone line, and an electrical energy storage circuit coupled to receive an increased D.C. voltage output by said D.C.-to-D.C. voltage converter.

8. A circuit arrangement according to claim 7, wherein said controlled switch circuit includes a comparator circuit coupled to said electrical energy accumulation and boost circuit, and an output switch circuit operative to couple said sufficient electrical energy to said coin relay in response to said comparator circuit detecting that the accumulated energy has reached a prescribed threshold sufficient to energize said coin relay.

9. A circuit arrangement according to claim 7, wherein said controlled switch circuit includes a delayed switching circuit, coupled to the output of said comparator circuit, and operative to decouple said electrical energy accumulation and boost circuit from said telephone line, subsequent to said output switch circuit coupling said sufficient electrical energy to said coin relay.

10. A circuit arrangement according to claim 6, further including an auxiliary power supply link arranged to be coupled in circuit from a central office to said coin relay and operative to energize said coin relay under the control of said central office.

* * * * *